United States Patent [19]

Zander et al.

[11] Patent Number: 5,251,839
[45] Date of Patent: Oct. 12, 1993

[54] SNAP-OPEN FILM CARTRIDGE

[75] Inventors: Dennis R. Zander, Penfield; Eugene Sisto, Rochester, both of N.Y.

[73] Assignee: Eastman Kodak Company, Rochester, N.Y.

[21] Appl. No.: 859,799

[22] Filed: Mar. 30, 1992

[51] Int. Cl.⁵ ............................. G03B 17/26
[52] U.S. Cl. .................. 242/71.1; 354/275; 220/335
[58] Field of Search .............. 242/71.1, 71.7, 197; 354/275; 206/389, 387, 397, 403–409, 413–416; 220/335

[56] References Cited

U.S. PATENT DOCUMENTS

| | | | |
|---|---|---|---|
| 4,033,523 | 7/1977 | Roman | 242/71.1 X |
| 4,887,747 | 12/1989 | Ostrowsky et al. | 220/335 X |
| 4,938,429 | 7/1990 | Robertson et al. | 242/71.1 |
| 4,962,401 | 10/1990 | Takahashi | 242/71.1 X |
| 5,053,795 | 10/1991 | Wyman | 242/71.1 X |
| 5,150,806 | 9/1992 | Glomski | 220/335 X |

Primary Examiner—John M. Jillions
Attorney, Agent, or Firm—Roger A. Fields

[57] ABSTRACT

In a film cartridge, a shell-like enclosure and a lid are latchingly engaged when the lid is closed, to hold the lid closed, and are latchingly engaged when the lid is opened part way to allow film movement in and out of the enclosure, to prevent the lid from being opened farther. The enclosure and the lid can be disengaged to permit the lid to be opened farther or to be closed.

2 Claims, 4 Drawing Sheets

1

SNAP-OPEN FILM CARTRIDGE

BACKGROUND OF THE INVENTION

1. Field of the Invention

The invention relates generally to the field of photography, and in particular to film cartridges. More specifically, the invention relates to a snap-open latch assembly for a cartridge door or lid.

2. Description of the Prior Art

Often, as disclosed in prior art U.S. Pat. No. 3,631,971, issued Jan. 4, 1972 a snap-open cartridge comprises a shell-like enclosure and a door or lid connected to the enclosure for opening to allow tape or other web movement in and out of the enclosure and for closing to seal the enclosure. Respective latch means on the enclosure and the lid engage when the lid is closed to hold the lid closed and disengage to permit the lid to be opened. No control means exists, however, for limiting the extent to which the lid can be opened during web movement in and out of the enclosure. This is undesireable because the web roll might fall out of the enclosure should the enclosure be inverted.

SUMMARY OF THE INVENTION

According to the invention, a film (or other web) cartridge comprising a shell-like enclosure, a lid connected to the enclosure for opening to allow film movement in and out of the enclosure and for closing to seal the enclosure, and respective latch means on the enclosure and the lid for engaging when the lid is closed to hold the lid closed and for disengaging to permit the lid to be opened, is characterized in that:

respective latch means on the enclosure and the lid engage when the lid is opened sufficiently to allow film movement in and out of the enclosure for preventing the lid from being opened farther and disengage to permit the lid to be opened farther or to be closed.

DETAILED DESCRIPTION OF THE PREFERRED EMBODIMENT

The invention is disclosed as being embodied preferably in a 35mm film cartridge. Because the features of this type of film cartridge are generally well known, the description which follows is directed in particular to elements forming part of or cooperating directly with the disclosed embodiment. It is to be understood, however, that other elements not specifically shown or described may take various forms known to persons of ordinary skill in the art.

Figure 1:
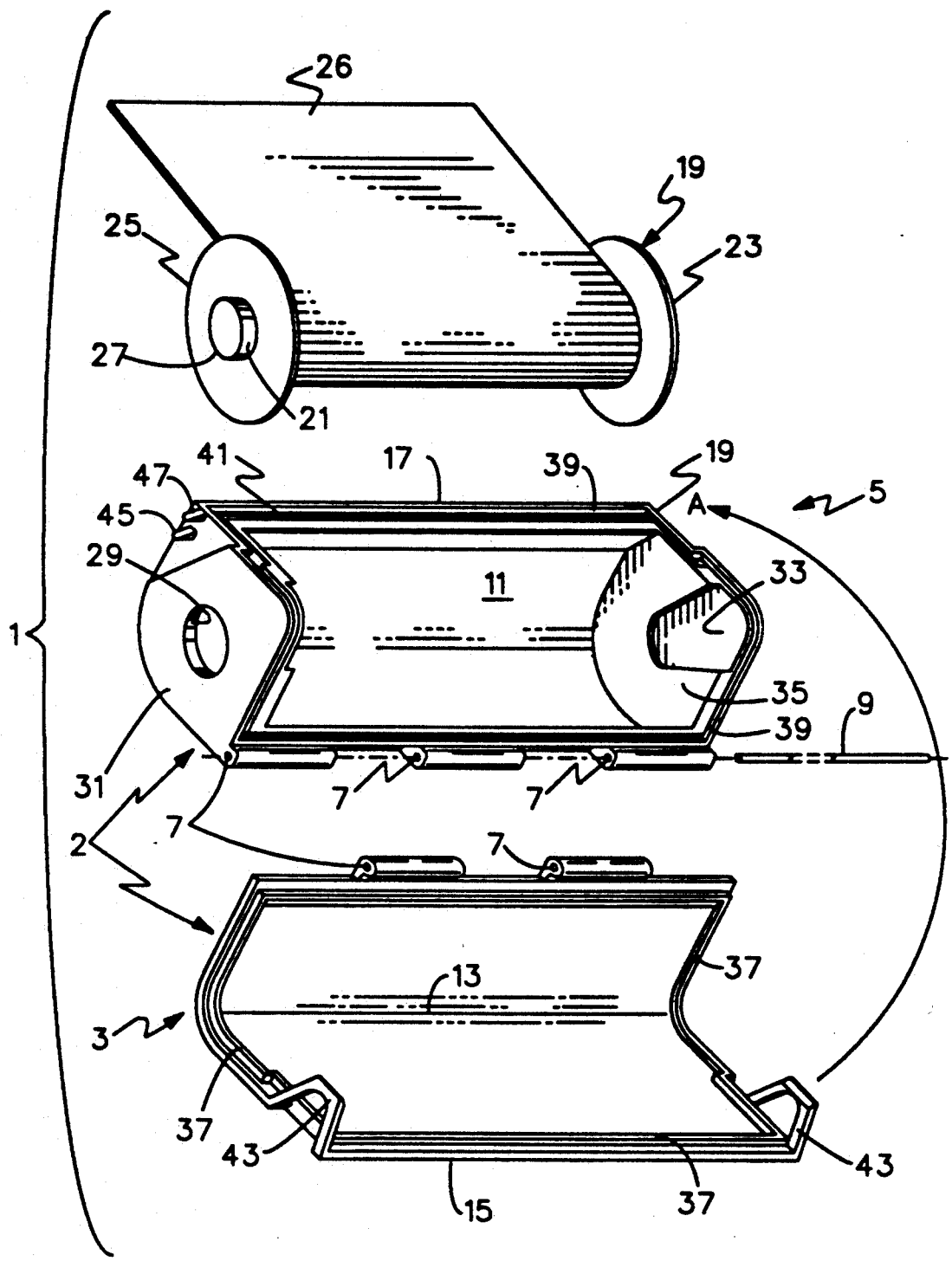
FIG. 1 is an exploded perspective view of a snap-open cartridge according to a preferred embodiment of the invention.

Referring now to the drawings, FIG. 1 shows a 35mm film cartridge 1 having a cartridge housing 2 made of plastic material and comprising a pair of shell halves 3 and 5. Several coaxial holes 7 in the two shell halves receive a pivot pin 9 to connect the shell halves. When the shell halves 3 and 5 are joined or folded together as indicated by the arrow A, they enclose a film chamber 11.

A line of weakness or crease-line 13 is cut on the inside of the shell halve 3 to effect an integral hinge which permits a certain portion of the shell halve between the crease-line and one end 15 of the shell halve to be easily lifted at that end from an opposite end 17 of the shell halve 5, to open the cartridge housing 2. This is similar somewhat to the arrangement shown in prior art U.S. Pat. No. 4,962,401, issued Oct. 9, 1990. Alternatively, a door or pivotal lid can be provided as shown in prior art U.S. Pat. No. 3,631,971, issued Jan. 4, 1972.

A film spool 19 has a hub or core 21 with a pair of integral flanges 23 and 25. A 35mm filmstrip 26 is wound on the hub 21 between the two flanges 23 and 25. See FIG. 1. One end portion 27 of the hub 21 is seated part way in a coaxial hole 29 in an end wall 31 of the shell halve 5 and another end portion, not shown, of the hub is seated in a recess 33 in an end wall 35 of the shell halve to support the film spool 19 for rotation in film winding and unwinding directions.

An elastomer hermetic plug, not shown, is sized to fit tightly in the hole 29 to act as an airtight seal in the hole. A continuous edge of the shell halve 3 includes a coextensive tongue or rib 37 and a continuous edge of the shell halve 5 includes a coextensive groove or channel 39. See FIG. 1. When the shell halves 3 and 5 are joined together as indicated by the arrow A, the tongue 37 is seated in the groove 39. An example of a film cartridge with tongue and groove mating of two shell-like parts is shown in prior art U.S. Pat. No. 4,420,120, issued Dec. 13, 1983. Compliant opaque material, such as a rubber gasket 41, is located in the bottom of the groove 39. The gasket 41 extends completely along the groove 39 to be compressed by the tongue 37 when the tongue is seated in the groove. Alternatively, instead of locating the gasket 41 in the groove 39, a modification of the tongue 37 can include a gasket tip, not shown, which is compressed when it is forced into the groove. In either instance, the gasket 41 or the gasket tip serves as an airtight seal.

Figure 2:
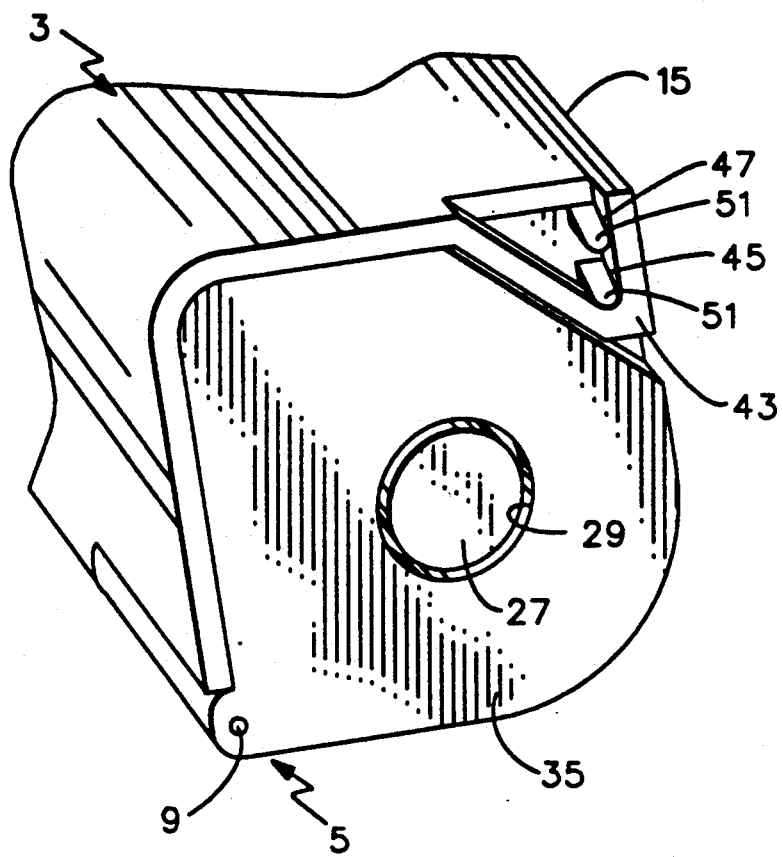
FIG. 2 is a partial perspective view of the snap-open cartridge shown with its lid closed.
Figure 3:
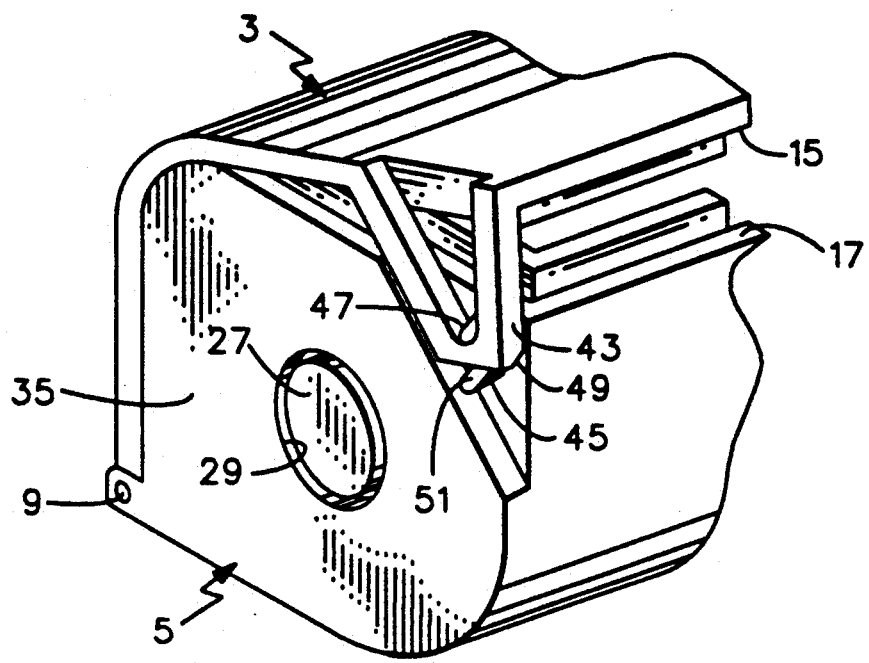
FIG. 3 is a partial perspective view of the snap-open cartridge shown with its lid partly opened.
Figure 4:
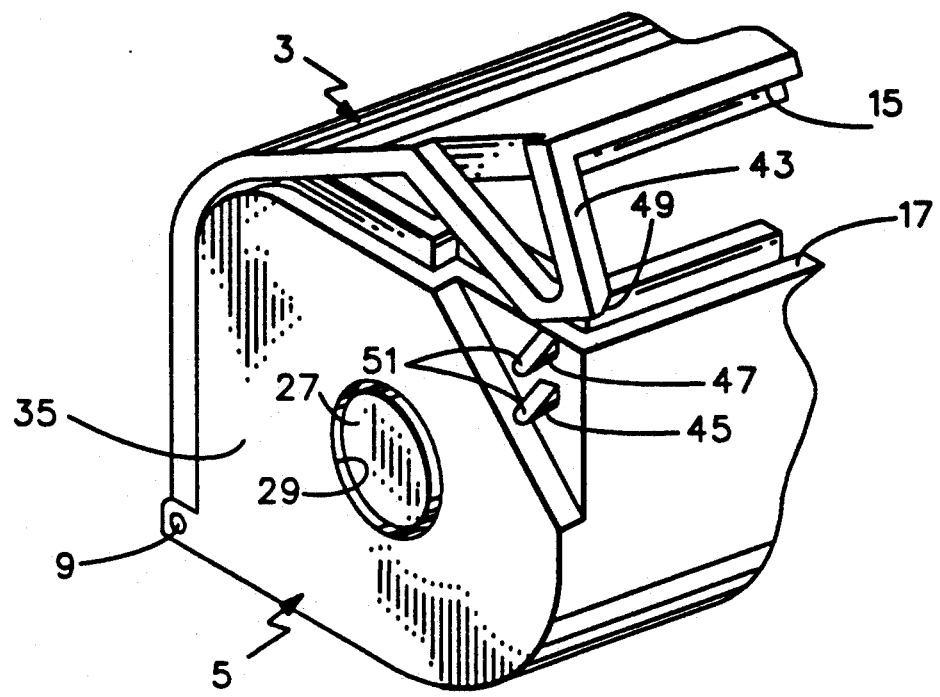
FIG. 4 is a partial perspective view of the snap-open cartridge shown with its lid fully opened.

According to the invention, the shell halve 3 includes an integral pair of latching components in the form of two identical hooks 43. See FIGS. 1–4. One of the hooks 43 is configured to alternatively engage a pair of latching components in the form of two separate posts 45 and 47 that project from the end wall 31 of the shell halve 5 and the other hook is configured to alternatively engage a similar pair of latching components in the form of two separate posts 45 and 47 that project from the end wall 35 of the shell halve. FIG. 2 shows the film cartridge 1 closed. In this instance, the two hooks 43 engage only the respective posts 45 to hold the cartridge housing 2 closed. FIG. 3 shows the film cartridge 1 opened sufficiently to allow film movement in and out of the film chamber 11, but not to allow removal of the film spool 19 from the chamber. In this instance, the two hooks 43 engage only the respective posts 47 to prevent the cartridge housing 2 from being opened farther. FIG. 4 shows the film cartridge 1 opened a greater extent to allow removal of the film spool 19 from the film chamber 11. In this instance, the two hooks 43 are located out of reach of the two posts 47. When closing the film cartridge 1 first part way as shown in FIG. 3 and then completely as shown in FIG. 2. the hooks 43 will snap over the respective posts 45 and 47. The hooks 43 each have a chamfered surface 49 and the posts 45 and 47 each have an inclined or ramped surface 51 to facilitate moving the hooks over the respective posts to close the film cartridge 1.

The invention has been described with reference to a preferred embodiment. However, it will be appreciated that variations and modifications can be effected within the ordinary skill in the art without departing from the scope of the invention.

We claim:

1. A film cartridge comprising a shell-like enclosure, a film spool rotatably supported inside said enclosure, a lid connected to said enclosure for opening to allow film movement in and out of the enclosure and for closing to seal the enclosure, and respective latch means on said enclosure and said lid for engaging when the lid is closed to hold the lid closed and for disengaging to permit the lid to be opened, is characterized in that:

respective latch means on said enclosure and said lid engage when the lid is opened sufficiently to allow film movement in and out of the enclosure, but not to allow removal of said spool from the enclosure, for preventing the lid from being opened farther and disengage to permit the lid to be opened farther to remove the spool or to be closed.

2. A film cartridge as recited in claim 1, wherein said latch means that engage when said lid is closed and said latch means that engage when the lid is opened include respective latch components on said enclosure and a single latch component on the lid which is configured to alternatively engage the first-mentioned latch components according to whether the lid is opened or closed.

* * * * *